No. 756,930. PATENTED APR. 12, 1904.
E. BOULANGER.
DRUM SNARE BRACE.
APPLICATION FILED FEB. 15, 1904.
NO MODEL.
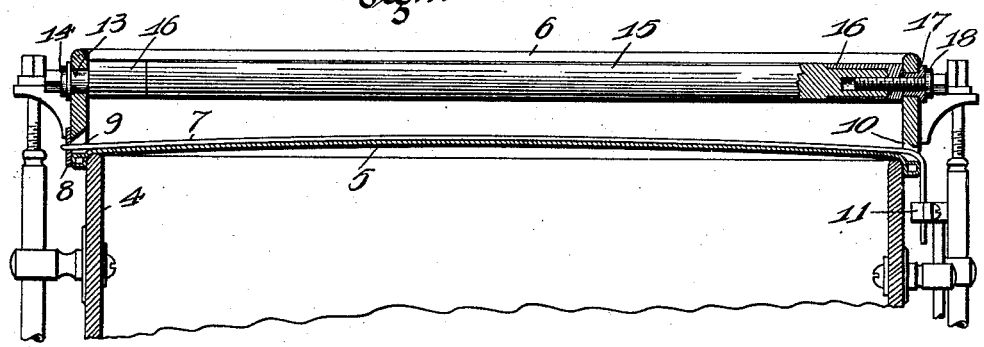
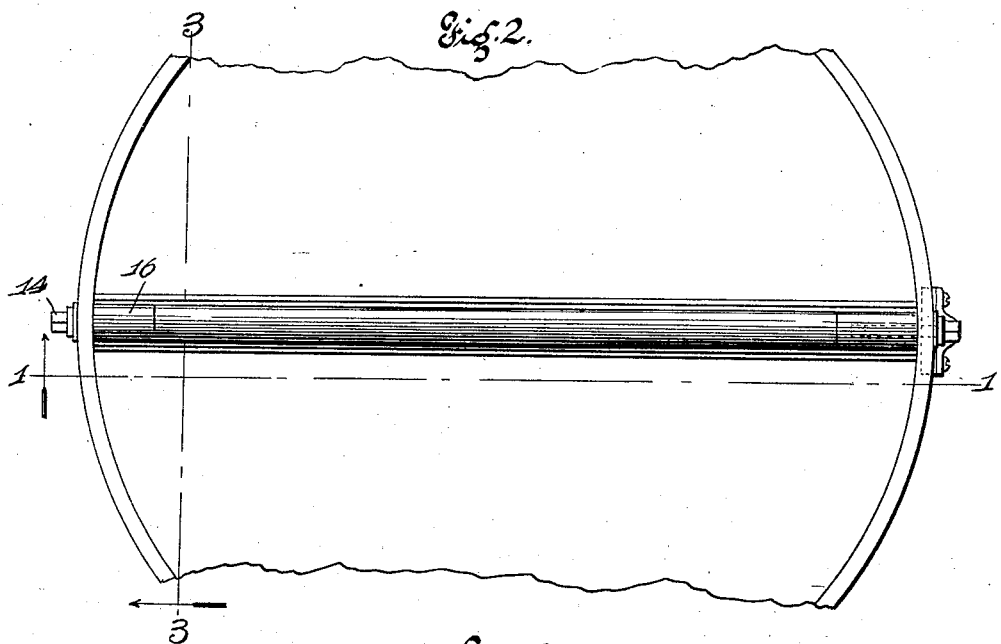
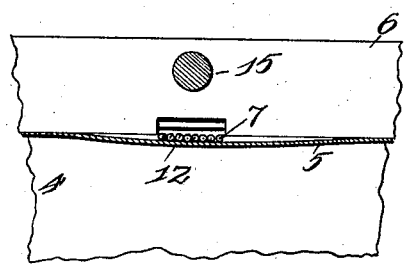
Witnesses
Alfred A. Eicks
M. Shrion
Inventor
Emile Boulanger
by Hydon & Longan & Hopkins Atty's No. 756,930. Patented April 12, 1904.

UNITED STATES PATENT OFFICE.

EMILE BOULANGER, OF ST. LOUIS, MISSOURI.

DRUM-SNARE BRACE.

SPECIFICATION forming part of Letters Patent No. 756,930, dated April 12, 1904.

Application filed February 15, 1904. Serial No. 193,677. (No model.)

*To all whom it may concern:*

Be it known that I, EMILE BOULANGER, a citizen of the United States, residing at St. Louis, State of Missouri, have invented certain new and useful Improvements in Drum-Snare Braces, of which the following is a specification containing a full, clear, and exact description, reference being had to the accompanying drawings, forming a part hereof.

My invention relates to drum-snare braces; and it consists of the novel features herein shown, described, and claimed.

In the drawings, Figure 1 is a sectional view of the snare-head, taken on the line 1 1 of Fig. 2 and looking in the direction indicated by the arrow. Fig. 2 is a plan of the snare-head, parts being broken away to economize space. Fig. 3 is a cross-section on the line 3 3 of Fig. 2.

Referring to the drawings in detail, the snare-head mechanism shown is of the latest and most approved construction and comprises the drum-shell 4, the snare-head 5, stretched over the end of the drum-shell, the hoop 6, holding the snare-head in position, and the snares 7, connected to a retaining-piece 8, passing through the opening 9 of the hoop 6 and through the opening 10 at the opposite side of the hoop 6 and attached to the adjustable tightener 11. At the points adjacent to the openings 9 and 10 the drum-shell 4 has its upper edge slightly cut away to form the depression 12, as shown in Fig. 3, and by this means when the snare-head is tightened it assumes a convex form along the line of the snares 7, as shown in Fig. 1, and this convexity of the snare-head is of the greatest importance, because when the snares are drawn tight they will rest upon and press against the snare-head throughout the entire distance from one side of the drum-shell to the other side.

The drum-shell 4 and the hoop 6 are supposed to be and ought to be a circle. If the drum was always to be kept dry, the desired convexity of the head would be maintained and my snare-brace would not be needed; but it is found that when the drum is used in the rain or in a moist atmosphere the tension of the snares will compress the shell and hoop, shortening the distance across the head on the line of the snares and lengthen the distance across the head upon a transverse line, and then there is a tendency for the snare-head to assume a concave form at its center, and then the snares will not press against the snare-head, and the drum is in poor condition.

The object of my invention is to provide a construction which will counteract the tension of the snares and hold the drum in its circular form.

A bearing-collar 13 is inserted through the hoop 6 directly above the opening 9, and a similar bearing-collar 17 is inserted through the hoop 6 above the opening 10. The snare-brace 15 has a cap 16 secured upon each of its ends, and said brace is placed in position within the hoop 6 on a line parallel with the snares 7. A screw 14 is inserted through the bearing-collar 13 and screw-seated in the cap 16 at one end of the brace, and a similar screw 18 is inserted through the bearing-collar 17 and screw-seated in the cap 16 at the other end of the brace, so as to hold the brace in position. The brace 15 is of the exact length required to prevent the shortening of the diameter of the hoop on the line of the snares, and the effect is to hold the hoop in its circular form, thereby holding the snare-head 5 in its convex form and allowing the snares to press against the snare-head.

It may sometimes happen that the drum-shell and hoop will expand on the line of the snares, and when there is such a tendency the screws 14 and 18 will serve to prevent such expansion.

It is obvious that the brace may be readily removed by removing the screw 18.

When the drum is perfectly dry and in a normal condition, the brace 15 will be of no benefit and it will not be of any disadvantage; but in damp weather the brace is almost essential and of great benefit.

I claim—

1. The combination with a drum, of a brace inserted in position to resist the tension of the snares, substantially as specified.

2. The combination with a drum, of a brace inserted in the hoop parallel with the snares and outside of the snares to resist the tension of the snares, substantially as specified.

3. A drum-snare brace, comprising a brace removably inserted in the hoop outside of the snare-head and parallel with the snares; and means of holding said brace in position; substantially as specified.

4. A drum-snare brace, comprising the combination with a snare-head mechanism of a brace inserted in the hoop; and screws inserted through the hoop and into the ends of the brace, substantially as specified.

5. The combination with a drum, of a brace on a line parallel with the snares to prevent expansion or contraction; substantially as specified.

In testimony whereof I have signed my name to this specification in presence of two subscribing witnesses.

EMILE BOULANGER.

Witnesses:
M. M. BRAZILL,
ALFRED A. EICKS.